(12) United States Patent
Shaick

(10) Patent No.: US 7,940,982 B1
(45) Date of Patent: May 10, 2011

(54) METHOD AND APPARATUS FOR COLOR SPACE CONVERSION USING PER-COLOR SELECTION OF LOOK-UP TABLE DENSITY

(75) Inventor: Ben-Zion Shaick, Zichron Yaacov (IL)

(73) Assignee: Zoran Corporation, Sunnyvale, CA (US)

( * ) Notice: Subject to any disclaimer, the term of this patent is extended or adjusted under 35 U.S.C. 154(b) by 1013 days.

(21) Appl. No.: 11/809,562

(22) Filed: May 31, 2007

(51) Int. Cl.
*G06K 9/00* (2006.01)

(52) U.S. Cl. ........ 382/162; 382/167; 382/246; 382/307; 382/308

(58) Field of Classification Search ................. 382/162, 382/167, 246, 307, 308; 345/156, 158, 619, 345/629; 358/1.9, 1.15; 710/65; 711/168, 711/200; 712/34, 210; 365/230.05
See application file for complete search history.

(56) References Cited

U.S. PATENT DOCUMENTS

| | | | |
|---|---|---|---|
| 4,275,413 A | 6/1981 | Sakamoto et al. | |
| 5,809,181 A | 9/1998 | Metcalfe | |
| 5,896,122 A | 4/1999 | MacDonald et al. | |
| 6,088,018 A * | 7/2000 | DeLeeuw et al. | 345/156 |
| 6,335,800 B1 | 1/2002 | Balasubramanian | |
| 6,389,161 B1 | 5/2002 | Krabbenhöft | |
| 6,719,392 B2 | 4/2004 | Qiao | |
| 6,771,275 B1 | 8/2004 | Cook et al. | |
| 6,862,111 B2 | 3/2005 | Lin et al. | |
| 6,934,053 B1 | 8/2005 | Mestha et al. | |
| 7,009,734 B2 | 3/2006 | Suwa et al. | |
| 2003/0053682 A1 | 3/2003 | Haikin et al. | |
| 2003/0147088 A1 | 8/2003 | Kulkarni | |
| 2004/0021882 A1 | 2/2004 | Kakutani | |

FOREIGN PATENT DOCUMENTS

EP 0923048 B1 6/1999

* cited by examiner

*Primary Examiner* — Anh Hong Do
(74) *Attorney, Agent, or Firm* — Frommer Lawrence & Haug LLP; Jamie L. Wiegand

(57) ABSTRACT

A method of performing color space conversion includes maintaining a data structure that has a plurality of dimensions and that contains a plurality of locations storing information in each of the dimensions. Each of the dimensions corresponds to a different one of a plurality of input color signal components. The number of locations which the data structure contains in a first one of the dimensions is different from the number of locations which the data structure contains in a second one of the dimensions. The method further includes inputting first data defined according to a first color space, and generating second data defined according to a second color space, by applying information contained in the data structure to the first data.

21 Claims, 10 Drawing Sheets

Tetrahedron 1

Tetrahedron 3

Tetrahedron 2

Prism 1-

*Tetrahedron 4*

*Tetrahedron 5*

*Prism 2*

METHOD AND APPARATUS FOR COLOR SPACE CONVERSION USING PER-COLOR SELECTION OF LOOK-UP TABLE DENSITY

FIELD OF THE INVENTION

At least one embodiment of the present invention pertains to mapping a multi-dimensional signal from one space to another space, and more particularly, to mapping a multi-dimensional color signal from one color space to another color space.

BACKGROUND

A "space", as the term is used herein, is a numerical or alphanumerical system for representing information. A "color space" is a numerical or alphanumerical system that can be used to represent color information by various different types of devices, such as computers, digital cameras, printers, etc. Some examples of different color spaces include RGB (red, green blue), YCrCb (luminance, red chrominance, blue chrominance, also called "YUV"), CMYK (cyan, magenta, yellow, black), HSV (hue, saturation, value) and HSL (hue, saturation, luminance).

Color space conversion is a process performed in many devices to convert pixel color data in one color space to pixel color data in a different color space. Television or other video color data may be provided to a computer system in YCrCb color space. YCrCb is the native color space of NTSC, PAL and MPEG. However, for a computer system to display that data, it may be necessary to convert the data to a color space that is compatible with the computer's display capabilities, such as RGB (red, green, blue) color space. RGB is the native color space of many personal computers and workstations. Similarly, a digital camera may capture image data in one color space but may have to convert it into another color space for purposes of displaying images on a the camera's display device or on a computer or for purposes of printing images.

Color space conversion can be problematic in the context multimedia signal processing, particularly where color data needs to be edited, changed, and/or transformed between color spaces and devices in order to be properly visualized. Fundamentally, the problem is one of accurate color management, color reproduction, color matching, color space transformation, gamut mappings, and the proper reproduction of color from memory and stored image data. In this context, the challenge is finding fast, inexpensive and accurate apparatus and methods to color map signals.

Two prior art solutions are known: the multi-dimensional polynomial interpolation function and multi-dimensional lookup-table (LUT). The first solution requires storing in memory polynomial coefficients, whereas in the LUT solution, samples of the mapped signal are stored in memory. Better mapping accuracy requires more polynomial coefficients for the first solution, and more samples for the second solution. An advantage of the polynomial interpolation approach's advantage over the LUT approach is that less memory is required when polynomial interpolation is employed. An advantage of the LUT approach over the polynomial interpolation approach is that its processing time is fixed, whereas the processing time of polynomial interpolation depends on the order of the polynomial. Also, the polynomial approach has limitations in terms of the complexity of mapping that it can estimate.

BRIEF DESCRIPTION OF THE DRAWINGS

One or more embodiments of the present invention are illustrated by way of example and not limitation in the figures of the accompanying drawings, in which like references indicate similar elements and in which.

DETAILED DESCRIPTION

Figure 1:
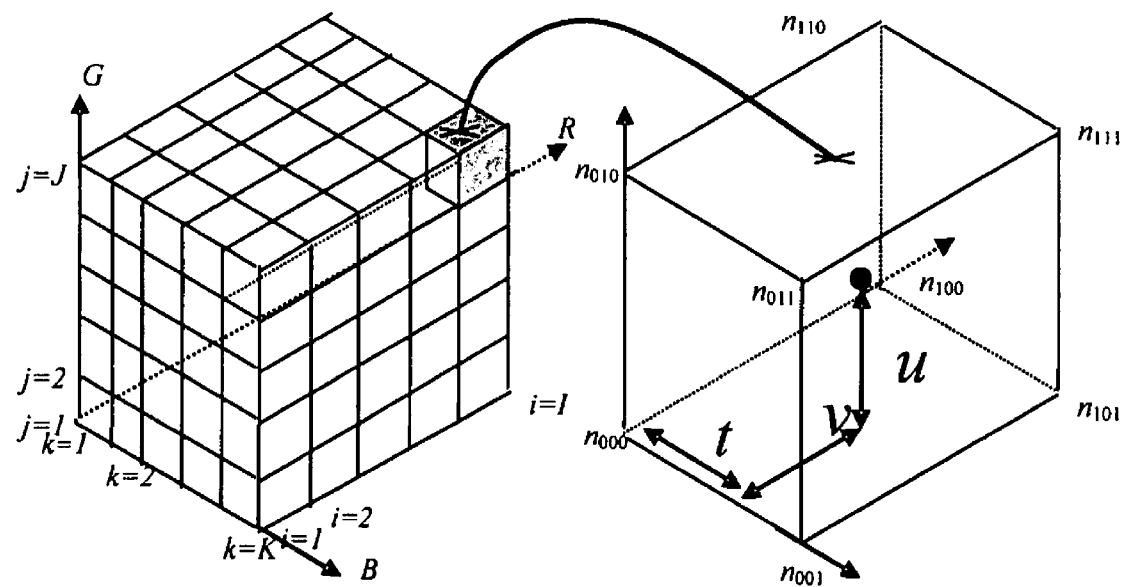
FIG. 1 illustrates a multi-dimensional transformation LUT.

A method and apparatus for mapping a multi-dimensional signal from one space to another space are described. Note that references in this specification to "an embodiment", "one embodiment", or the like, mean that the particular feature, structure or characteristic being described is included in at least one embodiment of the present invention. Occurrences of such phrases in this specification do not necessarily all refer to the same embodiment.

Overview

A significant advantage of a LUT approach over the conventional polynomial approach for color space conversion is that a LUT approach can estimate any complex mapping, whereas the conventional polynomial approach has limitations in this regard. Specifically, complex and varying transformations can be implemented using LUTs, where the size of the LUT grid determines the complexity and extent of the transformation.

Hence, according to one of the techniques introduced here, a color space conversion method includes maintaining a color space transformation LUT that contains multiple locations (also called "vertices", "nodes" or "entries") that store information, wherein each of the locations stores information specifying a mathematical function to be evaluated. Input data defined according to a first multi-dimensional color space (source color space) is used to generate output data defined according to a second multi-dimensional color space (target color space), by extracting the appropriate function to apply from the LUT, and then applying that function to the input data.

Note that the terms "conversion" and "transformation" and various forms thereof are used in this document to refer to a process that is perhaps more precisely called "mapping" (e.g., color space mapping). Hence, "conversion" or "transformation" in this context does not require that the input data (the data being converted or transformed) actually be altered; it simply means that a set of output data is produced based on (and, typically, different from) the input data.

Note also that the techniques introduced here are not limited to color space conversion. That is, the techniques introduced here can be applied and/or extended to allow mapping of essentially any type of data defined in a multi-dimensional space (source space) into another multi-dimensional space (target space).

In accordance with the techniques introduced here, a color space transformation LUT can contain a function and/or parameters of any type or form. In certain embodiments, the output includes samples of the input which have been processed through an algorithm that is based on parameters stored in the LUT. In certain embodiments, the output the transformation includes samples of the input which have been processed through a function, or multiple functions, stored in the LUT. The storage of a complex function, or two or more functions, in a LUT entry is especially advantageous for transforming, for example, the input color into a color for which the human eye can detect slight variations. The use of a complex function, or two or more functions, is also advantageous for accommodating variations in color sensor (CCD or CMOS) color sensitivity during the manufacturing of digital cameras.

In general, the techniques introduced here provide substantially more accurate color reproduction and substantially more flexibility in color editing than in prior art solutions.

Another aspect of the techniques described below is a second-order polynomial interpolation based on four values: two values of signal output and two derivative values. From these four values the polynomial coefficients can be calculated and than applied to the input signal. To accomplish this, one signal output value and one derivative value can be stored in every LUT entry. Storing the derivative reduces the LUT memory size, since the use of a second-order polynomial requires storing in every LUT entry three polynomial coefficients. If a higher-order polynomial is required, then higher-order derivatives can be stored to reduce the LUT memory size. This configuration results in a very efficient implementation of only two-multiplication operations per input color channel for each second-order polynomial (linear interpolation requires one multiplication, but is much less accurate).

Yet another LUT-based conversion techniques described below includes quantizing the mathematical derivative value (the slope) and attaching it to an index, in order to reduce the size of the LUT. The index can be stored in the LUT in place of the derivative value. The index can then be used to extract the derivative from a one-dimensional derivative LUT.

Still another aspect of the techniques described below is implementing a hybrid linear-polynomial interpolation in such way that accuracy is maintained, while both the size of the LUT and the processing time are reduced. To accomplish this, in certain embodiments only the derivative of the most-influencing color channel is stored and used during interpolation.

And, yet another LUT-based conversion technique described below includes selecting the density of the input/output mapping function separately for each input color component.

Linear Interpolation Based on LUT

Consider first a color space transformation that uses conventional linear interpolation, based on a LUT. The size of a LUT grid $N_g$ required to map all possible colors from a single input pixel to a single output pixel is $N_g = D_{out} \cdot Q_{in}^{D_{in}}$, where D is the dimensionality of the color signal, which should be set to 3 for RGB input and RGB output; and $Q_{in}$ is the signal quantization level, which should be set, for example, to 4096, that is 12 bits, for Charge Coupled Device (CCD) digital image sensors. In this example, the number of color possibilities for each pixel in the image grid would be 206, 158, 430, 208. This huge number comes from the fact that each pixel can display $D \cdot Q^D = 206, 158, 430, 208$ different colors, when Q=4096 and D=3, as in the above case. Note that this large number is not related to image grid size, only to the number of color variations possible for each pixel in the image grid. In view of this, it can be seen that there is a need to approach the use of a LUT in a careful, creative way, or the approach will not be practical.

A common solution to the use of LUTs is to employ a sub-sampled color grid of size $N_g = D_{out} \cdot \tilde{Q}^{D_{in}}$, where in common practice $\tilde{Q}$ lies between 17 and 33. The quality of the color mapping in this instance is dependent on the color grid location, the chosen grid values, and the interpolation algorithm used to evaluate the missing color samples. In terms of mapping quality, the minimum practical grid size mentioned for $\tilde{Q}$ in the literature, for the case of RGB to CMYK mapping, is 10.

The standard color mapping solution from the International Color Consortium (ICC) standards setting body is the use of a uniform color grid. Known solutions commonly perform an interpolation algorithm using a four-(tetrahedron), six-(prism) or eight-(cube) node construct. Each primary output color is individually found from separately interpolated primary LUT colors, where the interpolation is linear (a first order polynomial). The quality of the interpolation is evaluated in terms of interpolation error and smoothness of the mappings in nearby LUT color grid nodes. Lack of smoothness is due to small grid size or a rapidly changing mapping function, and can be visually noticed as a contour artifact in uniform regions of the photo.

It is currently believed that the tetrahedron approach gives the lowest interpolation error, since the tetrahedron is the smallest volume unit. As such, the distance from the input value to the values at the four vertices of the tetrahedron must be shorter than the inputs value's distance to the values at all six or eight vertices of the prism or cube. Thus, the interpolation error is smaller. Although examination of contour artifacts have not been compared for the three interpolation choices, the tetrahedron is chosen for the following conventional interpolation process description, which, beside the low error, requires only four memory calls per pixel.

A cube can be divided into 24 different tetrahedrons but to only 5 or 6 non-overlapping tetrahedrons. A cube is divided into six tetrahedrons for this example, because this segmentation provides the smallest unit volume, and because all six tetrahedrons have two common vertices. The example LUT grid and grid cube division is illustrated in FIG. 1.

FIG. 1 shows a conventional 3-dimensional (3D) tuplet of input RGB values. The LUT can be represented as a cube, which contains a number of smaller cubes, the vertices of which are the entries, or "nodes", n of the LUT. Each node n contains the three output rgb value tuplet, p. If CYMK is used, each node n contains the four output p values.

Figure 2A:
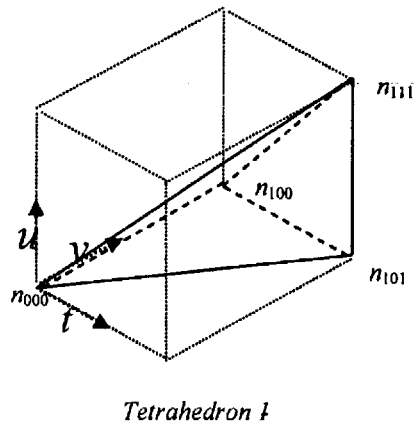
FIGS. 2A-2C show three different tetrahedrons that an be formed within a first prism in a cube that represents part of a multi-dimensional LUT.
Figure 2C:
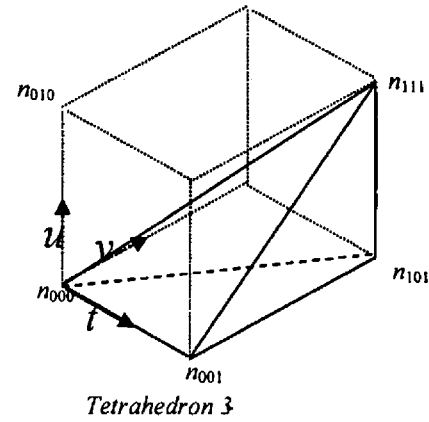
Figure 2B:
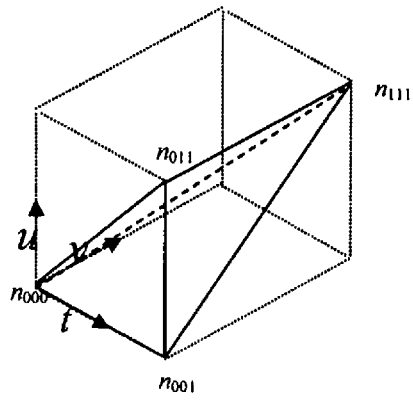
Figure 2D:
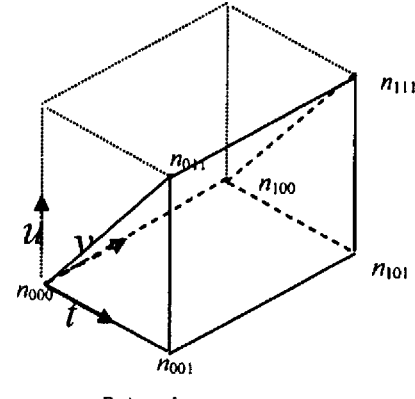
FIG. 2D shows the prism corresponding to the tetrahedrons of FIGS. 2A-2C.
Figure 3A:
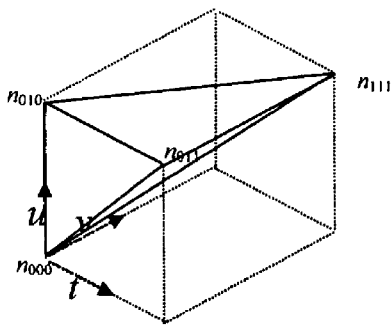
FIGS. 3A-3C show three different tetrahedrons that an be formed within a second prism in a cube that represents part of a multi-dimensional LUT.
Figure 3C:
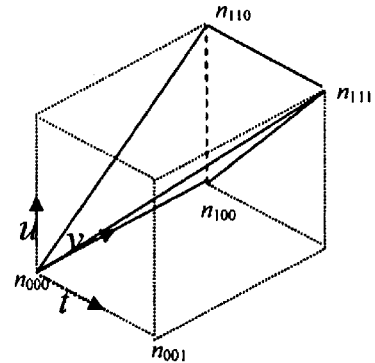
Figure 3B:
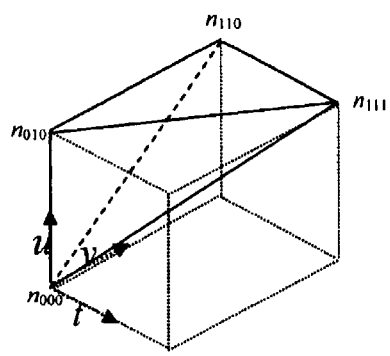
Figure 3D:
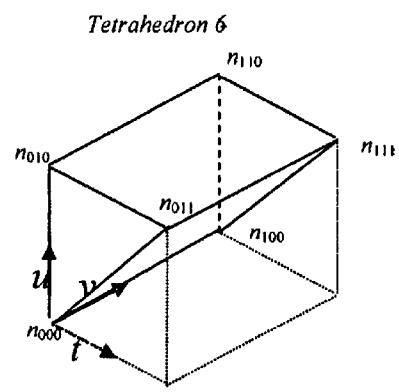
FIG. 3D shows the prism corresponding to the tetrahedrons of FIGS. 3A-3C.

In this approach, the cube is divided into a pair of separable prisms, prism1 which is shown in FIG. 2D and prism2 which is shown in FIG. 3D. Prism1 is divided into three tetrahedrons, tetrahedron1, tetrahedron2 and tetrahedron3, shown in FIGS. 2A through 2C, respectively. Prism2 is divided in the same manner into tetrahedron4, tetrahedron5 and tetrahedron6, shown in FIGS. 3A through 3C, respectively. The conditions in Table 1 can be used to find the correct tetrahedron into which to locate the input pixel.

TABLE 1

Tetrahedron Identification

| Tetrahedron | conditions | | |
|---|---|---|---|
| 1 | t > u | | t < v |
| 2 | | t ≧ v | v < u |
| 3 | | | v ≧ u |
| 4 | t ≦ u | | t < v |
| 5 | | t ≦ v | v < u |
| 6 | | | v ≧ u |

In Table 1, the values v, u and t represent the normalized input signal colors, red (R), green (G) and blue (B), respectively, inside the relevant sub-cube (see definition below).

Next, the conventional linear interpolation algorithm will be mathematically formulated. Note that the linear interpolation algorithm is not the same type of "interpolation" as the tetrahedral interpolation referred to above and below. Tetrahedral interpolation is used to describe that the output signal is interpolated using exactly four (4) entries of LUT rgb tuplet. The linear interpolation algorithm, on the other hand, can be used to implement the tetrahedral interpolation by using the four entries of the tetrahedral to separately evaluate the contribution of the R, G and B to the final output color signal.

Assume the following:

Input signal is (R, G, B) (e.g., a camera sensor RGB color space);

Output signal is (r, g, b) (e.g., the sRGB (display) color space);

Input signal size is $S=2^{12}$ bits;

Output red channel LUT is $L_r(i, j, k)$ of grid size of $I_r \times J_r \times K_r$ entries;

Output green channel LUT is $L_g(i, j, k)$ of grid size of $I_g \times J_g \times K_g$ entries;

Output blue channel LUT is $L_b(i, j, k)$ of grid size of $I_b \times J_b \times K_b$ entries; and $n_{000}=(i, j, k)$ denotes the coordinates value of the LUT inner cube where $$i = \left\lfloor \frac{R}{T_R} \right\rfloor, \quad T_R = \frac{S}{I-1} = 2^{12-n}, \quad j = \left\lfloor \frac{G}{T_G} \right\rfloor,$$

$$T_G = \frac{S}{J-1} \text{ and } k = \left\lfloor \frac{B}{T_B} \right\rfloor, \quad T_B = \frac{S}{K-1}.$$

The value $p_{000}$ denotes the stored content in $n_{000}$ coordinates in the LUT. The value $p_{id}$ is the LUT contents where id is the cubic vertex coordinates. The value $p_{id}$ holds 3 parameters: $p_{r,id}$, $p_{g,id}$ and $p_{b,id}$ that hold the output signal value of the red, green and blue channels, respectively.

$$\tilde{v} = R - i \cdot T_R, \quad v = \frac{\tilde{v}}{T_R}$$

$$\tilde{u} = G - j \cdot T_G, \quad u = \frac{\tilde{u}}{T_G}$$

$$\tilde{t} = B - k \cdot T_B, \quad t = \frac{\tilde{t}}{T_B}$$

Figure 4:
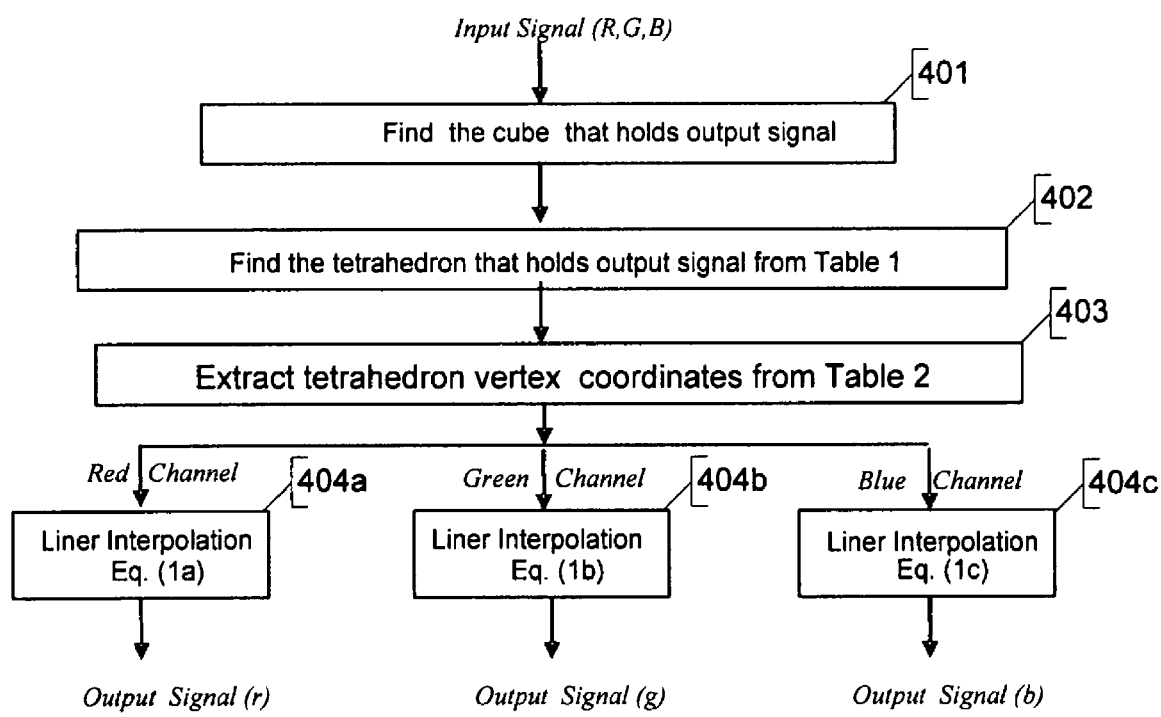
FIG. 4 shows an example of a process for performing color space transformation using linear-interpolation, with tetrahedral interpolation to determine the LUT output values.

FIG. 4 shows an example of a process for performing color space transformation using linear-interpolation, with tetrahedral interpolation to determine the LUT output values. Initially, at 401 the process finds the cube within the LUT that holds the output signal (which is the cube that contains the input signal). Next, at 402 the process finds the tetrahedral within that cube that holds the output signal. The tetrahedral can be located by using Table 1, above. At 403 the process extracts the tetrahedral's (LUT) vertex coordinates. The vertex coordinates may be determined from Table 2, below. Finally, at 404a, 404b and 404c, the process performs linear interpolation using equations (1a), (1b) and (1c), respectively, to determine the final output signal values. The standard linear interpolation for the case where the LUT contains constant values is given by:

$$r = p_{r,000} + \Delta_{r,t} + \Delta_{r,u} + \Delta_{r,v} = p_{r,000} + s_{r,t} \cdot t + s_{r,u} \cdot u + s_{r,v} \cdot v \quad (1a)$$

$$g = p_{g,000} + \Delta_{g,t} + \Delta_{g,u} + \Delta_{g,v} = p_{g,000} + s_{g,t} \cdot t + s_{g,u} \cdot u + s_{g,v} \cdot v \quad (1b)$$

$$b = p_{b,000} + \Delta_{b,t} + \Delta_{b,u} + \Delta_{b,v} = p_{b,000} + s_{b,t} \cdot t + s_{b,u} \cdot u + s_{b,v} \cdot v \quad (1c)$$

where output signal values $p_{r,000}$, $p_{g,000}$ and $p_{b,000}$ are the red, green and blue values, respectively, extracted from the LUT grid. The values $\Delta_t$, $\Delta_u$ and $\Delta_v$ are the additional signal values of the blue, green and red channels, respectively. The values $s_t$, $s_u$, $s_v$ are given by $$s_{r,t} = p_{r,id2_{(t)}} - p_{r,id1_{(t)}}, \quad s_{r,u} = p_{r,id2_{(u)}} - p_{r,id1_{(u)}}, \quad s_{r,v} = p_{r,id2_{(v)}} - p_{r,id1_{(v)}}$$

$$s_{g,t} = p_{g,id2_{(t)}} - p_{g,id1_{(t)}}, \quad s_{g,u} = p_{g,id2_{(u)}} - p_{g,id1_{(u)}}, \quad s_{g,v} = p_{g,id2_{(v)}} - p_{g,id1_{(v)}}$$

$$s_{b,t} = p_{b,id2_{(t)}} - p_{b,id1_{(t)}}, \quad s_{b,u} = p_{b,id2_{(u)}} - p_{b,id1_{(u)}}, \quad s_{b,v} = p_{b,id2_{(v)}} - p_{b,id1_{(v)}} \quad (2)$$

TABLE 2

Tetrahedron vertex coordinates

| Tetrahedron | Blue | | Green | | Red Channel | |
|---|---|---|---|---|---|---|
| | $id2_{(t)}$ | $id1_{(t)}$ | $id2_{(u)}$ | $id1_{(u)}$ | $id2_{(v)}$ | $id1_{(v)}$ |
| 1 | 101 | 100 | 111 | 101 | 100 | 000 |
| 2 | 001 | 000 | 011 | 001 | 111 | 011 |
| 3 | 001 | 000 | 111 | 101 | 101 | 001 |
| 4 | 011 | 010 | 010 | 000 | 111 | 011 |
| 5 | 111 | 110 | 010 | 000 | 110 | 010 |
| 6 | 111 | 110 | 110 | 100 | 100 | 000 |

LUT of Functions/Hybrid Polynomial Interpolation

With the above description providing context, consider now a different form of LUT based technique, specifically, one in which a transformation LUT contains mathematical functions (e.g., interpolation functions), rather than just output signal samples. This approach facilitates implementation of special interpolation algorithms.

Figure 5:
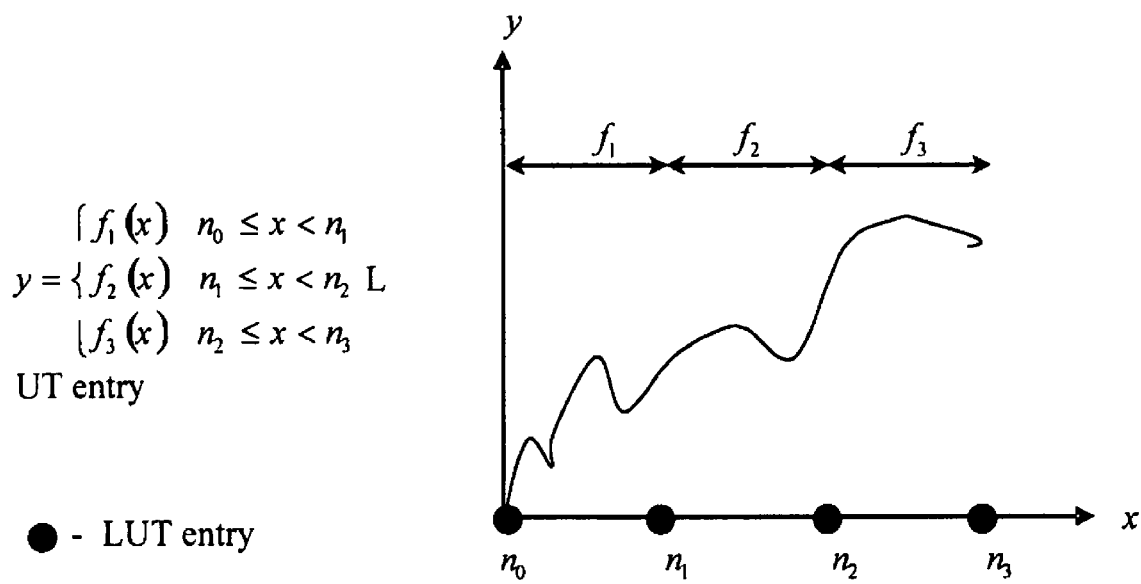
FIG. 5 shows an example of the contents of a one-dimensional LUT where each LUT location contains a function.

To simplify explanation, first consider a one-dimensional (1D) LUT mapping. FIG. 5 shows an example of the contents of a 1D LUT, where the input signal, x, is the index to the output signal, y. When transforming colors from 3D input RGB to 3D output rgb, for example, x represents R, G or B, and y represents r, g or b. The ith LUT entry $n_i$ stores a function $f_{i+1}(x)$, which can be an interpolation function. A different function can be stored in each LUT entry.

In practice, each LUT entry stores sufficient information to uniquely and completely define a function, such as information identifying the type of function and one or more parameters of the function. For example, the type of function can be polynomial, trigonometric (e.g., cosine), or statistical (e.g., Gaussian Mixture Model (GMM)), where the corresponding parameters can be: polynomial order and coefficients (for a polynomial type function); amplitude, angle and offset (for a cosine type function); means and standard deviations (for a statistical type function).

When implementing a tetrahedral LUT, each output channel (r, g or b) is actually a separable combination of f(R), f(G) and f(B). Hence, in the more-realistic case of a 3D LUT corresponding to RGB-to-rgb transformation, each 3D LUT entry can hold the following information, where $\Gamma_{y,x}$ represents the influence, as a second-order polynomial, of the x color input on the y color output, where x can be any of the input color components (e.g., R, G or B) and y can be any of the output color components (e.g., r, g or b):

1) Information to be used to formulate $\Gamma_{r,t}$:
   a) function type for r output as function of R input
   b) function parameters for r output as function of R input
2) Information to be used to formulate $\Gamma_{r,u}$:
   a) function type for r output as function of G input
   b) function parameters for r output as function of G input
3) Information to be used to formulate $\Gamma_{r,v}$:
   a) function type for r output as function of B input
   b) function parameters for r output as function of B input
4) Information to be used to formulate $\Gamma_{g,t}$:
   a) function type for g output as function of R input
   b) function parameters for g output as function of R input
5) Information to be used to formulate $\Gamma_{g,u}$:
   a) function type for g output as function of G input
   b) function parameters for g output as function of G input
6) Information to be used to formulate $\Gamma_{g,v}$:
   a) function type for g output as function of B input
   b) function parameters for g output as function of B input
7) Information to be used to formulate $\Gamma_{b,t}$:
   a) function type for b output as function of R input
   b) function parameters for b output as function of R input
8) Information to be used to formulate $\Gamma_{b,u}$:
   a) function type for b output as function of G input
   b) function parameters for b output as function of G input
9) Information to be used to formulate $\Gamma_{b,v}$:
   a) function type for b output as function of B input
   b) function parameters for b output as function of B input Let $\vec{P}(i)$ be a vector of parameters $p_1(i), \ldots, p_N(i)$ stored in the ith LUT entry, where $f_{i+1}(\ )$ is an interpolation function associated with parameters $\vec{P}(i)$, $\vec{P}(i+1)$, and the input signal is located between the ith and (i+1)th LUT entries. Recall that $p_{000}$ denotes the stored content in coordinates $n_{000}$ of the LUT and that $p_{id}$ is the LUT contents, where id is the tetrahedral vertex coordinates. Hence, in one embodiment, the contents $p_{id}$ of each LUT entry include the following six parameters (two for each of the three color components, assuming RGB):

values $p_{r,id}$, $p_{g,id}$, and $p_{b,id}$, which are the output signal values of red, green and blue channels, respectively; and derivatives $$p_{dr,id} = \left(\frac{dr}{dR}\right)_{id}, \quad p_{dg,id} = \left(\frac{dg}{dG}\right)_{id}, \quad p_{db,id} = \left(\frac{db}{dB}\right)_{id},$$

which are the slopes of the red, green and blue outputs, respectively.

The interpolation function coefficients can be calculated from the value and slope of two successive LUT entries. In practice, the derivative values need not be directly stored in every LUT entry. Instead, the derivatives can be quantized and represented by an index number in the LUT. In that case the derivatives values can be acquired directly from an additional 1D LUT by using the index number.

To permit the use of a smaller LUT (i.e., less memory), a second-order polynomial interpolation can be implemented in the direction of the most-influencing color, such that the output signal is an estimation of one polynomial (second-order) interpolation and two linear interpolations (i.e., a "hybrid polynomial interpolation") as follows.

$$r = p_{r,000} + \Delta_{r,t} + \Delta_{r,u} + \Gamma_{r,v} = p_{r,000} + s_{r,t} \cdot t + s_{r,u} \cdot u + \Gamma_{r,v} \quad (3a)$$

$$g = p_{g,000} + \Delta_{g,t} + \Gamma_{g,u} + \Delta_{g,v} = p_{g,000} + s_{g,t} \cdot t + \Gamma_{g,u} s_{g,v} \cdot v \quad (3b)$$

$$b = p_{b,000} + \Gamma_{b,t} + \Delta_{b,u} + \Delta_{b,v} = p_{b,000} + \Gamma_{b,t} + s_{b,u} \cdot u + s_{b,v} \cdot v \quad (3c)$$

where the second-order polynomial interpolation part is given by $$\Gamma_{r,v} = v \cdot \left(\left(\frac{p_{dr,id1(v)} - p_{dr,id2(v)}}{2}\right) \cdot (n_{id2(v)} - R) + P_{r,id2(v)} - P_{r,id1(v)}\right) \quad (4a)$$

$$\Gamma_{g,u} = u \cdot \left(\left(\frac{p_{dr,id1(u)} - p_{dr,id2(u)}}{2}\right) \cdot (n_{id2(u)} - G) + P_{g,id2(u)} - P_{g,id1(u)}\right) \quad (4b)$$

$$\Gamma_{b,t} = t \cdot \left(\left(\frac{p_{db,id1(t)} - p_{db,id2(t)}}{2}\right) \cdot (n_{id2(t)} - B) + P_{b,id2(t)} - P_{b,id1(t)}\right) \quad (4c)$$

and the linear interpolation part can be estimated from equation system (2).

In equations (3a), (3b) and (3c), $\Delta_{y,x}$ represents the influence, as a first-order polynomial, of the x color input on the y color output, while $\Gamma_{y,x}$ represents the influence, as a second-order polynomial, of the x color input on the y color output, where x can be any of the input color components (e.g., R, G or B) and y can be any of the output color components (e.g., r, g or b).

This hybrid polynomial interpolation approach is based on the assumption that: the r output depends mostly on the R input and less on G and B; the g output depends mostly on the G input and less on R and B; and the b output depends mostly on the B input and less on the R and G. In other words, R is the "most-influencing" color channel for the r output; G is the "most-influencing" color channel for the g output; and B is the "most-influencing" color channel for the b output. Consequently, $\Gamma_{r,u}$ and $\Gamma_{r,t}$ can be less complex than $\Gamma_{r,v}$. In particular, $\Gamma_{r,u}$ and $\Gamma_{r,t}$ can be first-order polynomials whereas $\Gamma_{r,v}$ can be a second-order polynomial, and so forth for the other output color components. The first-order polynomial can be the common linear interpolation which can be implemented by storing the output signal values in the LUT, whereas the second-order polynomial can be implemented by storing the output signal and first-order derivative (slope) in the LUT.

Note that in other embodiments, a LUT entry might store a polynomial of order higher than second-order, or a derivative thereof. For example, the size of the LUT grid can be reduced even further by storing in $\Gamma_{r,u}$ and $\Gamma_{r,t}$ second-order polynomials while storing in $\Gamma_{r,v}$ third-order polynomial, and so forth.

Thus, in one embodiment, for each particular evaluation of any of equations (3) or (4), if the computation is being done for the most-influencing color channel, then both the output value $P_r$ and the derivative value $p_{dr}$ are used from the LUT; whereas if the computation is being done for a color channel other than the most-influencing color channel, then only the output value $P_r$ is used from the LUT in the computation.

Note that the interpolation embodied in equations (3a), (3b) and (3c) is not the same type of "interpolation" as the tetrahedral interpolation referred to above and below. As already noted, tetrahedral interpolation is used to describe that the output signal is interpolated using exactly four (4) entries of LUT rgb tuplet. The hybrid polynomial interpolation of equations (3a), (3b) and (3c), on the other hand, can be used to implement the tetrahedral interpolation by using the four entries of the tetrahedral to separately evaluate the contribution of the R, G and B to the final output color signal.

Figure 6:
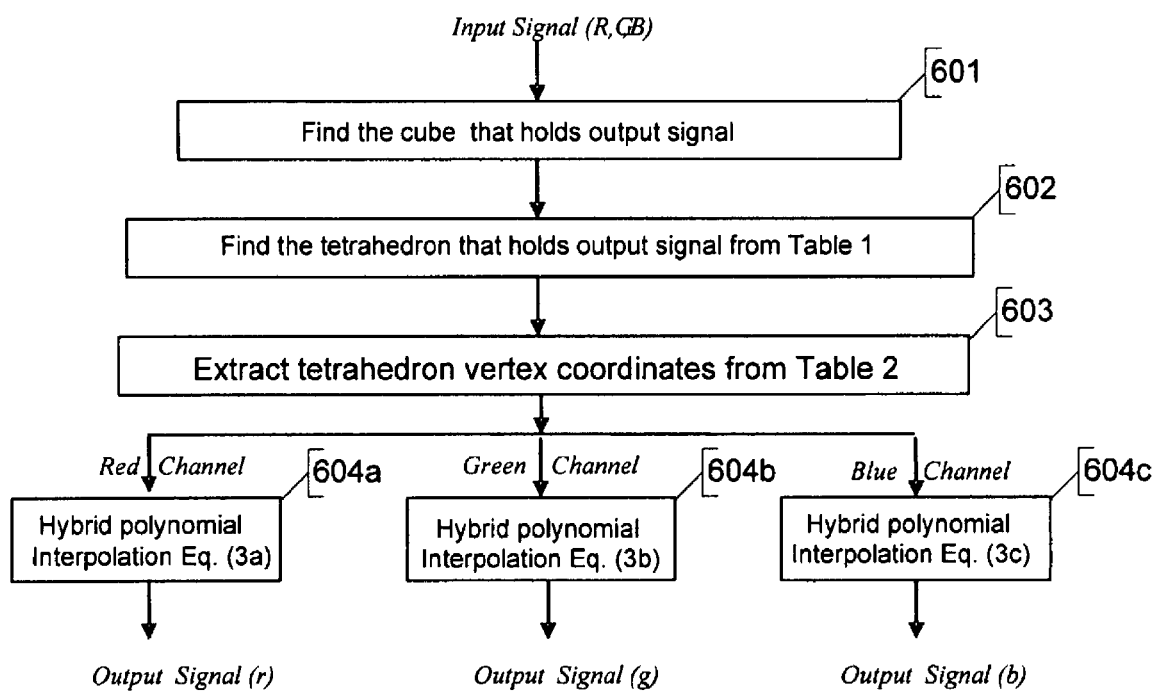
FIG. 6 shows an example of the process flow for using a hybrid polynomial based on LUT approach, using tetrahedral interpolation to determine the LUT output values.

FIG. 6 shows an example of the process flow for using the hybrid polynomial based on LUT approach, using tetrahedral interpolation to determine the LUT output values. It can be seen that the process is essentially the same as that represented in FIG. 4, except that in the final operation (604a, 604b and 604c), hybrid polynomial interpolation is performed on the LUT outputs according to equations (3a), (3b) and (3c) to generate the final output signal values, rather than linear interpolation according to equations (1a), (1b) and (1c).

The following discussion explains how $\Gamma_v$ can be formulated. Recall that $\Gamma_v$ is the interpolation function. Theoretically, the third-order polynomial interpolation can be implemented using a LUT with R, G, B triple output values and three slopes.

Practically, a second-order polynomial can be estimated instead, since its imlemention requires only a single multiplication operator.

First, $\Gamma_1$ and $\Gamma_2$ are found, and then the weighted $\Gamma_v$ is evaluated using the following equation, $$\Gamma_v = (1-v) \cdot \Gamma_1(R-n_1) + v \cdot \Gamma_2(R-n_1), \quad (5)$$

where $$v = \frac{R-n_1}{n_2-n_1} = \frac{R-n_1}{T_R}$$

and $n_1$, $n_2$ are successive input values corresponding to successive pairs of LUT entries. Theoretically the two polynomials should be identical, but practically they are not, since the slope values are quantized in the LUT for the purpose of achieving a smaller memory size.

Next, we find the relationship between the polynomial coefficients a, b, $p_1$ and the slopes $$dp_1 = \frac{dr}{d(R-n_1)}\bigg|_{(R-n_1)=0}, \quad dp_2 = \frac{dr}{d(R-n_1)}\bigg|_{(R-n_1)=T_R}$$

of $\Gamma_1(R-n_1) = r - p_1 = a \cdot (R-n_1)^2 + b \cdot (R-n_1)$ polynomial.

$$\frac{dr}{d(R-n_1)} = 2 \cdot (R-n_1) + b, \quad dp_1 = b \text{ and } dp_2 = 2 \cdot a \cdot T_R + dp_1 \quad (6)$$

$$\text{yields} \begin{cases} b = dp_1 \\ a = \frac{dp_2 - dp_1}{2T_R} \end{cases}$$

$$\Gamma_1 = \frac{dp_2 - dp_1}{2T_R} \cdot (R-n_1)^2 + dp_1 \cdot (R-n_1) =$$

$$T_R \cdot \left(\frac{dp_2 - dp_1}{2} \cdot v^2 + dp_2 \cdot v\right),$$

$$\Gamma_1 = T_R \cdot \left(\frac{dp_2 - dp_1}{2} \cdot v^2 + dp_1 \cdot v\right)$$

Next, $\Gamma_2$ is evaluated. First $\Gamma_2$ is found as function of $1-v$ with the opposite x-axis.

$$\begin{cases} b = dp_2 \\ a = \frac{dp_1 - dp_2}{2T_R} \end{cases} \quad (7)$$

$$r - p_2 = T_R \cdot \left[\frac{dp_2 - dp_1}{2} \cdot (1-v)^2 - dp_2 \cdot (1-v)\right]$$

yields $\Gamma_2 =$ $$r - p_1 = p_2 - p_1 + T_R \cdot \left[\frac{dp_2 - dp_1}{2} \cdot (1-v)^2 - dp_2 \cdot (1-v)\right]$$

Putting equations (6) and (7) into equation (5), we have:

$$\Gamma_v = (1-v) \cdot T_R \cdot \left\{\frac{dp_2 - dp_1}{2} \cdot v^2 + dp_1 \cdot v\right\} + v \cdot \{p_2 - p_1 + T_R \cdot$$

$$\left[\frac{dp_2 - dp_1}{2} \cdot (1-v)^2 - dp_2 \cdot (1-v)\right]\}$$

$$= (1-v) \cdot T_R \cdot \left\{\frac{dp_2 - dp_1}{2} \cdot (v - v^2 + v^2) + dp_1 \cdot v - dp_2 \cdot v\right\} +$$

$$v \cdot (p_2 - p_1)$$

$$= v \cdot \left\{(1-v) \cdot T_R \cdot \frac{dp_1 - dp_2}{2} + p_2 - p_1\right\}$$

$$= v \cdot \left\{(n_2 - R) \cdot \frac{dp_1 - dp_2}{2} + p_2 - p_1\right\}$$

Figure 7:
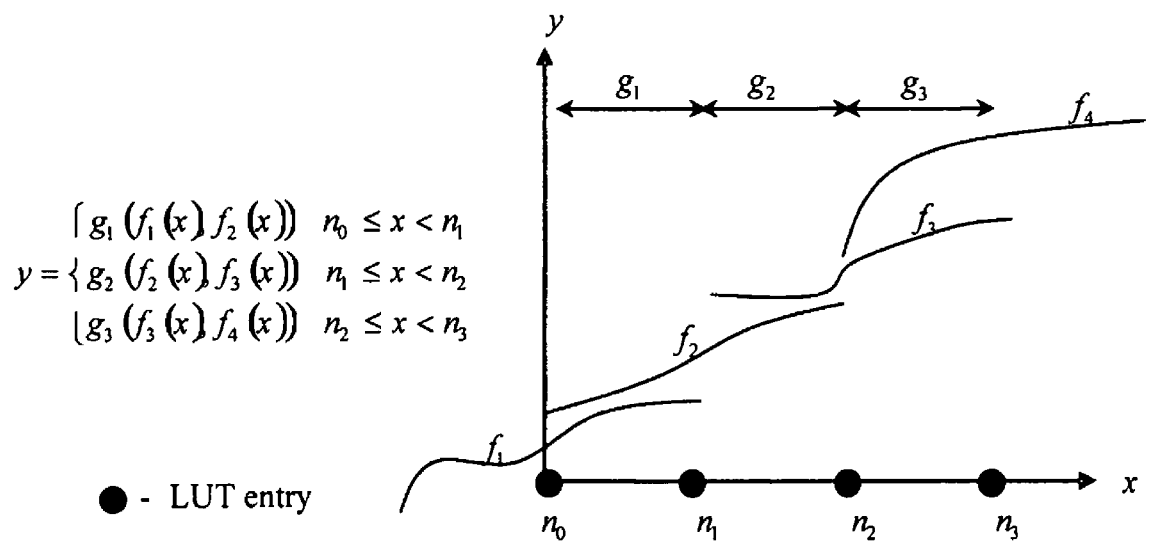
FIG. 7 shows an example of the contents of a one-dimensional LUT where each LUT location contains a function and an interpolation type.

In another embodiment, represented in FIG. 7, a LUT can be used to interpolate between two or more mathematical functions that are stored in two or more different LUT entries. In such an embodiment, one or more LUT entries can store an interpolation type in addition to a function type and parameters. Hence, the ith LUT entry $n_i$ effectively stores a function $f_{i+1}(x)$ and an interpolation type $g_i$. The interpolation type $g_i$ can be, for example, linear, cubic, sinc, etc. If the interpolation type $g_i$ is linear, for example, then $g_i(f_i(x), f_{i+1}(x)) = v \cdot f_i(x) + (1-v) \cdot f_{i+1}(x)$, where v $$= \frac{x - n_i}{n_{i+1} - n_i}.$$

Per-Color Selection of LUT Density

The effect of the hybrid polynomial interpolation approach described above can alternatively be achieved by using a common LUT of output signal values, i.e., a LUT that does not contain functions, slopes, etc. In the above description, it was stated that the interpolation functions for the less-influencing color channels can be less complex than the interpolation function for the most-influencing color channel; and therefore, the interpolation functions for the less-influencing color channels can be first-order polynomials while the interpolation function for the most-influencing color channel is a second-order polynomial.

However, instead of using more or less complex functions, an alternative approach which achieves essentially the same effect is to increase or reduce the size of the LUT grid, so that: 1) in the 3D LUT of the r output, there are more entries (vertices) in the R input axis than in the G or B axes; 2) in the 3D LUT of the g output, there are more entries in the G input axis than in the R or B axes; and/or 3) in the 3D LUT of the b output, there are more entries in the B input axis than in the R or G axes. Hence, the density of the input/output mapping function (i.e., the number of bins in a particular color's transformation LUT) can be selected separately for each input color. This approach allows the output accuracy to be adjusted on a per-color basis.

Figure 8:
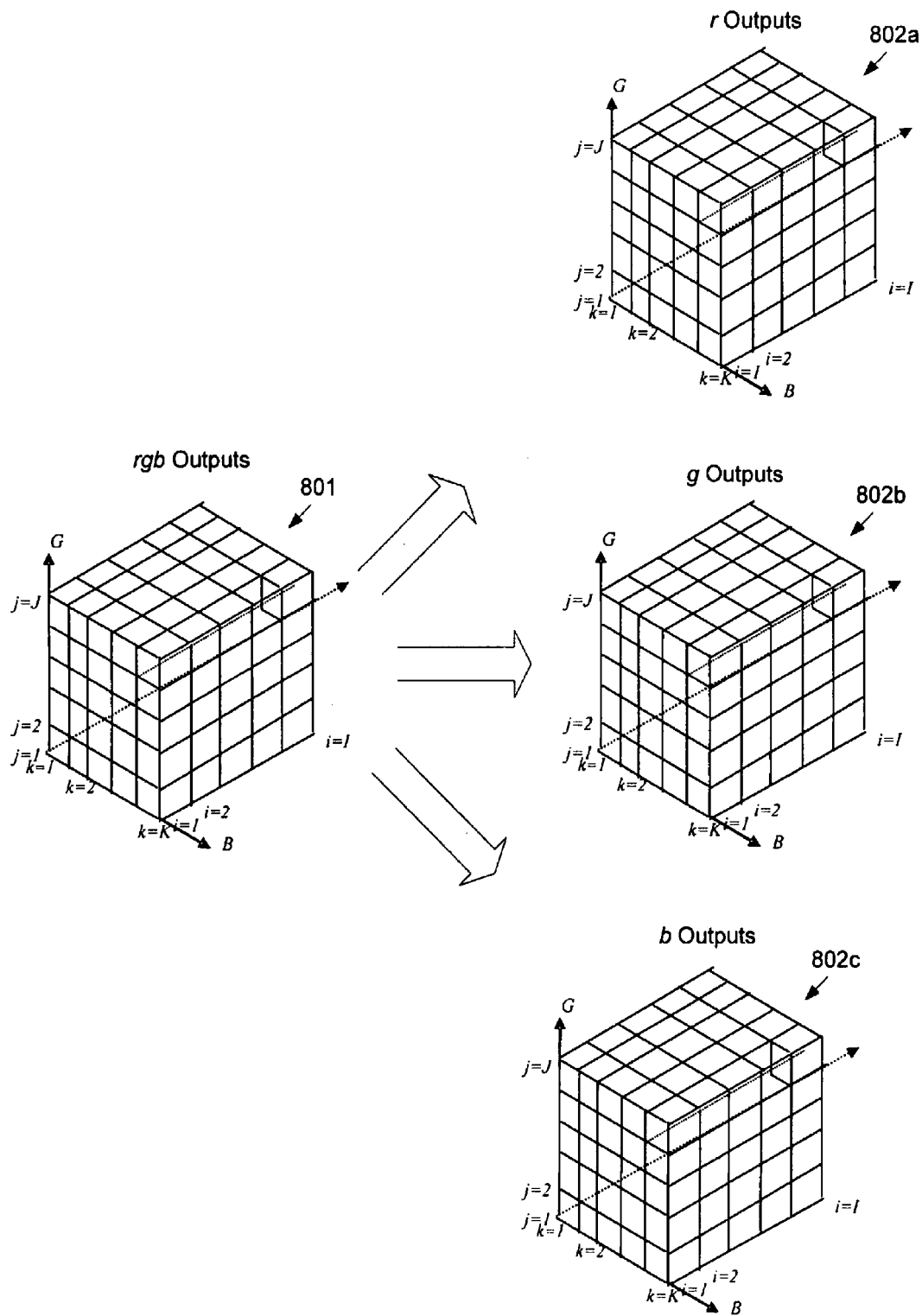
FIG. 8 shows the restructuring of a single multi-dimensional transformation LUT into multiple LUTs, one for each output channel.

In one embodiment, each input dimension is a color component of the input signal, and a separate transformation LUT is defined for each output color component. This approach is illustrated in FIG. 8, which shows that the traditional 3D LUT 801 of rgb tuplets (one dimension for each R, G, B input value) can be restructured into three 3D LUTs 802a, 802b and 802c, for generating the r, g and b outputs, respectively. For example, each LUT 802a, 802b or 802c stores the mapped result of an input sample with R, G, or B chromaticity to the combined r, g or b output value to which it is transformed.

Thus, assuming RGB color space as an example, one LUT 802a is used to produce the red output r, a second LUT 802b is used to produce green output g, and a third LUT 802c is used to produce the blue output b. The separate color LUTs 802a, 802b and 802c are not necessarily symmetrical, nor do they need to have any particular number of dimensions. For example, LUTs can be employed whose dimensions are 9 by 17 by 12 bins. The best dimensions for the transformation LUTs 802a, 802b and 802c are those that minimize color errors between the input image and the resulting color transformed output image. These dimensions can be defined by empirical measurements, as described below, or by the use of real-time in-device or factory calibration measurements.

To further illustrate this technique, assume that each input pixel value of the image being color mapped is represented by three color values, R, G and B. These values are used as an index into the three separate LUTs, 802a, 802b and 802c, each representing only one output color, r, g, or b, in its storage locations (grid points). At each storage location in the table there will be combinations of R, G, and B input values. Following this approach, for any given input pixel, only the first LUT 802a is used to produce the r output value, only the second LUT 802b is used to produce the g output value, and only the third LUT 802c is used to produce the b output value. Mapping the input color component values into three separate output color LUTs allows each color to be individually addressed, and the density of each output color grid to be changed depending on the accuracy required to map a particular input color to a particular output color.

As noted above, the best dimensions for the transformation LUTs are those that minimize color errors between the input image and the resulting color transformed output image. These dimensions can be determined by, for example, empirical measurements. A technique for determining the optimal LUT dimensions empirically will now be described.

In a general case, starting from M N-dimensional LUTs with Z samples (grid size) for each axis, we denote a first LUT as LUT1. Assume that the user already has the initial values of LUT1 and that all of the LUT axes $Z=Z_{m,n}$ are the same size, where n are the axis input indices of the m-output component and $1 \leq n \leq N$, $1 \leq m \leq M$. The number of samples in LUT1 is $M \cdot Z^N$. The problem is to find another LUT, LUT2, with a smaller number of samples than LUT1 and with reproduction error smaller than $\sigma_{max}$.

Figure 9:
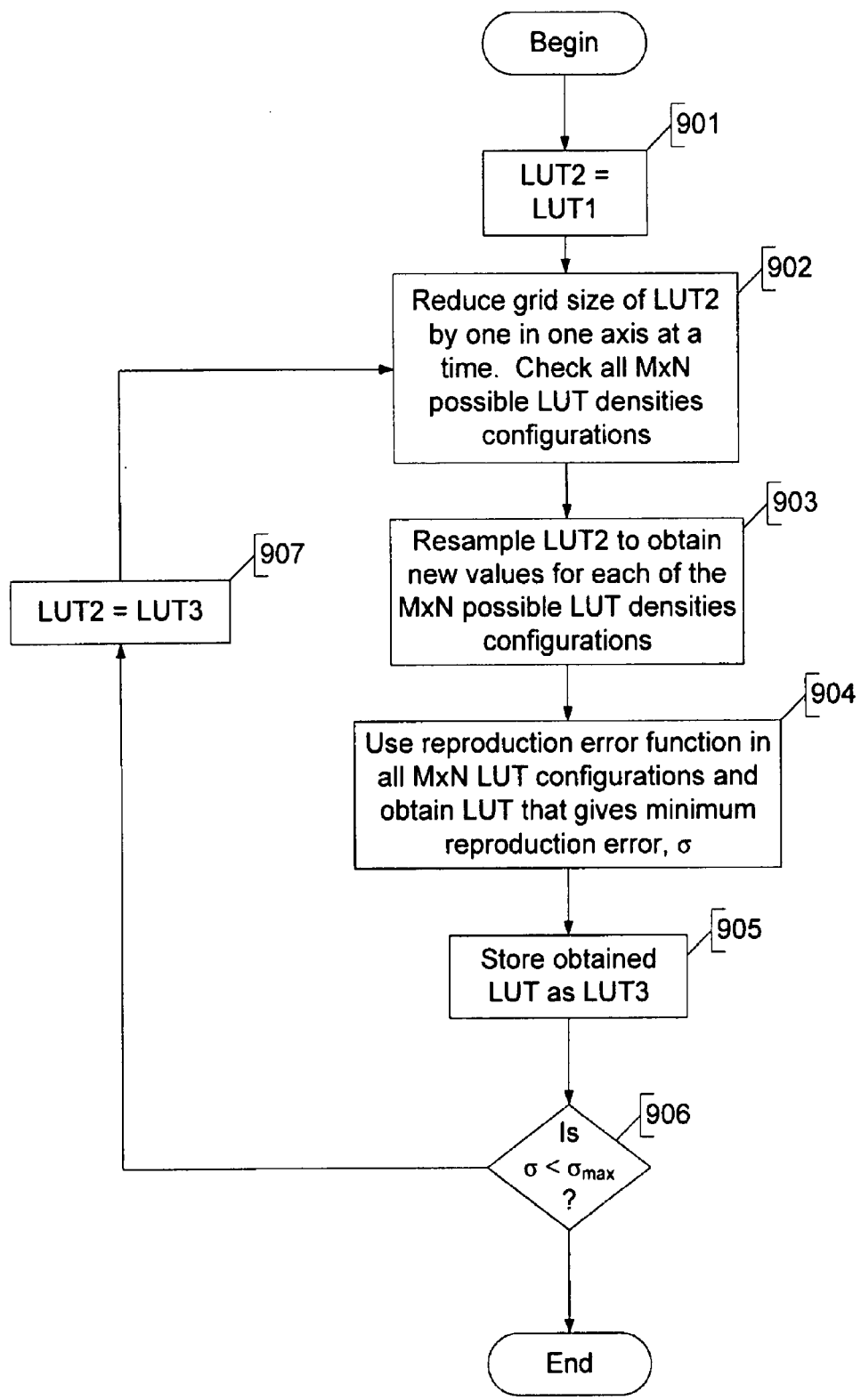
FIG. 9 shows an example of a process for empirically determining the optimal dimensions of a color transformation LUT.

To initiate the procedure for determining the optimal LUT dimensions, a validation set of input values {x} is first prepared. Then the user defines the reproduction error function $\sigma=\epsilon(LUT1, LUT2, \{x\})$. The function should compare the output values of LUT1 and LUT2 of input values {x} by calculating, for example, the root mean square (RMS) error. Referring now to FIG. 9, the procedure according to one embodiment continues as follows.

First, in block 901 LUT2 is set equal to LUT1. Next, at block 902 the grid size of LUT2 is reduced by one in one axis at time, resulting in M×N LUTs of different grid size. At 903, each one of the M×N LUTs is obtained by resampling LUT2 (the user can use, for example, linear interpolation to resample the LUT). At 904 the reproduction error function is then used in all of the M×N LUTs, and the LUT that gives the minimum reproduction error σ is obtained and then stored as LUT3 at 905. At 906 the error condition is tested, and if the error $\sigma<\sigma_{max}$, then LUT2 is set equal to LUT3 at 907, and the process then loops back to 902; otherwise, the process ends Thus, the techniques introduced here include separating an output color space into individual color components and utilizing, on a per-color basis, a transformation mapping grid of output values with different grid densities, based on the interpolation error measured between the known color of the input and the measured color of the output. Thus, this approach is responsive to both the characteristics of the input acquisition system and the characteristics of the output display system. Fundamentally, the technique includes the change of input/output density mapping as a function of measured color error.

The techniques described above can be implemented in essentially any kind of device that can acquire, generate, process or produce image data. For example, the techniques described above can be implemented in a digital camera, computer, printer or display device.

Figure 10:
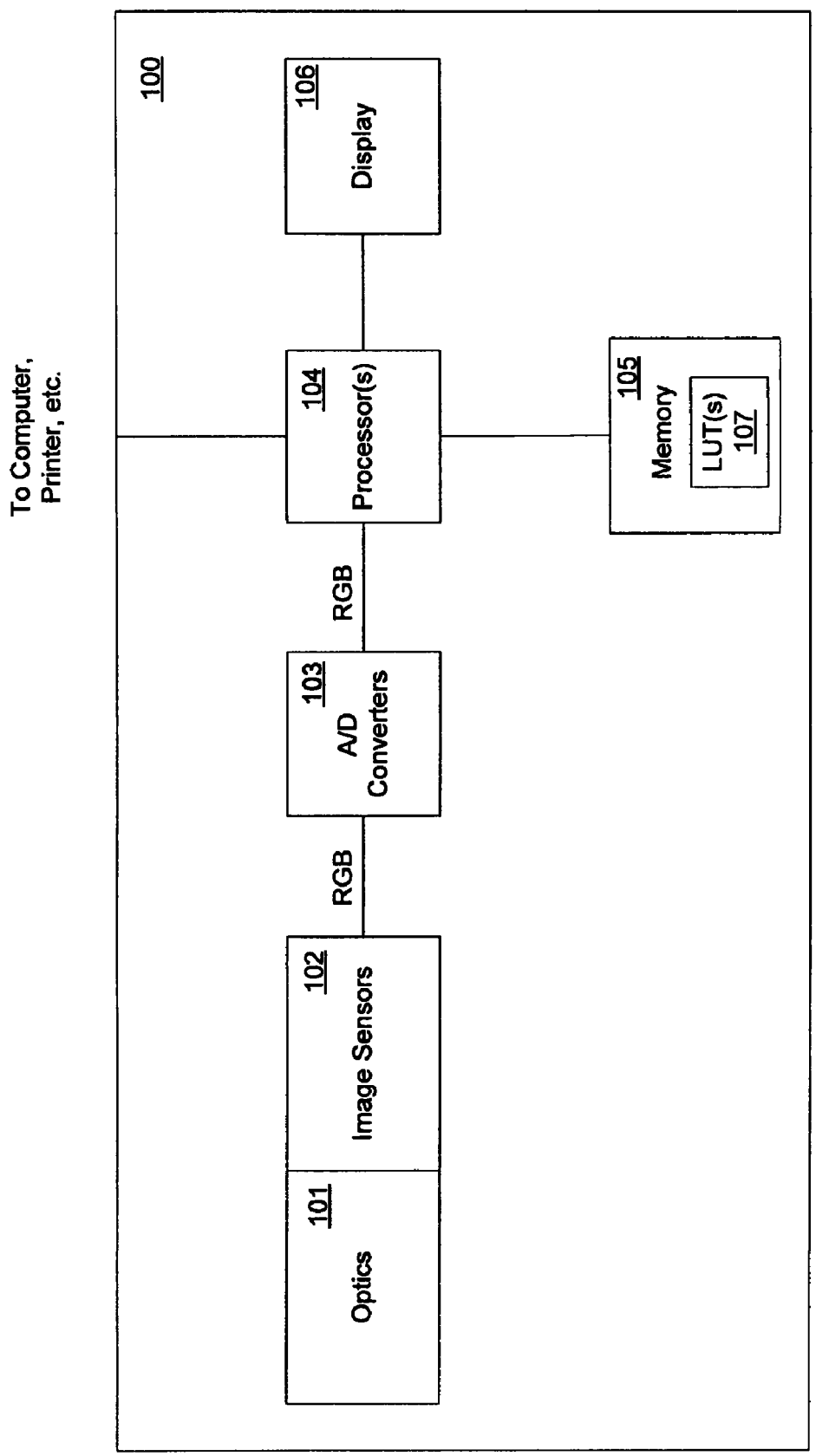
FIG. 10 is a high-level block diagram of a digital camera.

FIG. 10 shows a block diagram of a digital camera which can implement any one or more of the above-described techniques. The digital camera 100 includes a set of optics (e.g., one or more lenses and/or light guides) 101, a set of image sensors 102 optically coupled to the optics 101, a set of analog-to-digital (A/D) converters 103 having inputs electrically coupled to outputs of the image sensors 102, and one or more processors 104 coupled to receive the outputs of the A/D converters 103. The image sensors 102 may produce separate R, G and B color signals. The camera 100 further includes a display device 106 coupled to outputs of the processor(s) 104, and a memory having bi-directional communication with the processor(s) 104.

In operation, the image sensors 102 (e.g., CCD or CMOS sensors) receive input light through the optics 101 and, in response, produce analog output color signals R, G and B to the A/D converters. The A/D converters convert those input color signals to digital form, which are provided to the processor(s) 104.

The processor(s) 104 may perform any of various well-known types of processing on those input color signals. The processor(s) 104 also may perform color space conversion and/or other types of signal transformation in accordance with the techniques introduced above. The processor(s) 104 may be or include, for example, any one or more of: a programmed microprocessor or digital signal processor (DSP), a microcontroller, an application specific integrated circuit (ASIC), a programmable logic device (PLD), etc.

The memory 105 may be or include, for example, any one or more of: flash memory, read-only memory, random access memory (RAM), etc. Memory 107 may be used to store LUTs 107 and associated color data in accordance with the techniques introduced above.

Processed or raw color data can be output to the display device 106 for display and/or to one or more external devices, such as a computer or printer.

Note that while the above description has focused on the transformation of color signals in the RGB space, the techniques introduced above are not limited in applicability to transformation from or to RGB or any other particular color space(s). Further, it will be recognized that the basic principles of the techniques introduced above can also be applied in applications other than color space conversion, to map any type of multi-dimensional signal from one space to another. As just one example, the disclosed principles and techniques can be applied in 2D-to-2D mapping of geometrical distortion of object shape in images, where object pixel coordinates (X,Y) are mapped to a new location (x,y).

Thus, a method and apparatus for mapping a multi-dimensional signal from one space to another space have been described.

The techniques introduced above can be implemented in special-purpose hardwired circuitry, in software and/or firmware in conjunction with programmable circuitry, or in a combination thereof. Special-purpose hardwired circuitry may be in the form of, for example, one or more application-specific integrated circuits (ASICs), programmable logic devices (PLDs), field-programmable gate arrays (FPGAs), etc.

Software or firmware to implement the techniques introduced here may be stored on a machine-readable medium and may be executed by one or more general-purpose or special-purpose programmable microprocessors. A "machine-readable medium", as the term is used herein, includes any mechanism that provides (i.e., stores and/or transmits) information in a form accessible by a machine (e.g., a computer, network device, personal digital assistant (PDA), manufacturing tool, any device with a set of one or more processors, etc.). For example, a machine-accessible medium includes recordable/non-recordable media (e.g., read-only memory (ROM); random access memory (RAM); magnetic disk storage media; optical storage media; flash memory devices; etc.), etc.

The term "logic", as used herein, can include, for example, special-purpose hardwired circuitry, software and/or firmware in conjunction with programmable circuitry, or a combination thereof.

Although the present invention has been described with reference to specific exemplary embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense.

The invention claimed is:

1. A method operating within one or more microprocessors of performing color space conversion, the method comprising:
    maintaining a data structure that has a plurality of dimensions and that contains a plurality of locations storing information in each of the dimensions, each of the dimensions corresponding to a different one of a plurality of input color signal components, wherein the number of locations which the data structure contains in a first one of the dimensions is different from the number of locations which the data structure contains in a second one of the dimensions; and
    inputting first data defined according to a first color space;
    generating second data defined according to a second color space, by applying information contained in the data structure to the first data.

2. A method as recited in claim 1, wherein the data structure comprises a plurality of multi-dimensional look-up tables (LUTs), each corresponding to a different output color component.

3. A method as recited in claim 2, wherein each of the multi-dimensional LUTs includes a plurality of locations, each location containing an output color signal value for a particular combination of the plurality of input color signal components.

4. A method as recited in claim 3, wherein the plurality of multi-dimensional LUTs comprises three multi-dimensional look-up tables (LUTs), each corresponding to a different output color signal component, each of the multi-dimensional LUTs having a separate dimension for each of the plurality of input color signal components.

5. A method as recited in claim 4, wherein each of said multi-dimensional LUTs is a three-dimensional LUT.

6. An apparatus comprising:
    an input device to receive first data defined according to a first color space;
    a memory having stored therein a data structure that has a plurality of dimensions and that contains a plurality of locations storing information in each of the dimensions, each of the dimensions corresponding to a different one of a plurality of input color signal components, wherein the number of locations which the data structure contains in a first one of the dimensions is different from the number of locations which the data structure contains in a second one of the dimensions; and
    a processor to generate second data defined according to a second color space, by applying information contained in the data structure to the first data.

7. An apparatus as recited in claim 6, wherein the apparatus is a digital camera.

8. An apparatus as recited in claim 6, wherein the data structure comprises a plurality of multi-dimensional look-up tables (LUTs), each corresponding to a different output color component.

9. An apparatus as recited in claim 8, wherein each of the multi-dimensional LUTs includes a plurality of locations, each location containing an output color signal value for a particular combination of the plurality of input color signal components.

10. An apparatus as recited in claim 9, wherein the plurality of multi-dimensional LUTs comprises three multi-dimensional look-up tables (LUTs), each corresponding to a different output color signal component, each of the multi-dimensional LUTs having a separate dimension for each of the plurality of input color signal components.

11. An apparatus as recited in claim 9, wherein each of said multi-dimensional LUTs is a three-dimensional LUT.

12. A digital camera comprising:
    a set of optics;
    an image sensor coupled to the optics;
    an analog-to-digital converter to generate first data defined according to a first color space based on output of the image sensor;
    a memory having stored therein a data structure that has a plurality of dimensions and that contains a plurality of locations storing information in each of the dimensions, each of the dimensions corresponding to a different one of a plurality of input color signal components, wherein the number of locations which the data structure contains in a first one of the dimensions is different from the number of locations which the data structure contains in a second one of the dimensions; and
    a processor to generate second data defined according to a second color space, by applying information contained in the data structure to the first data.

13. A digital camera as recited in claim 12, wherein the data structure comprises a plurality of multi-dimensional look-up tables (LUTs), each corresponding to a different output color component.

14. A digital camera as recited in claim 13, wherein each of the multi-dimensional LUTs includes a plurality of locations, each location containing an output color signal value for a particular combination of the plurality of input color signal components.

15. A digital camera as recited in claim 14, wherein the plurality of multi-dimensional LUTs comprises three multi-dimensional look-up tables (LUTs), each corresponding to a different output color signal component, each of the multi-dimensional LUTs having a separate dimension for each of the plurality of input color signal components.

16. A digital camera as recited in claim 15, wherein each of said multi-dimensional LUTs is a three-dimensional LUT.

17. An apparatus comprising:
logic to maintain in a memory a data structure that has a plurality of dimensions and that contains a plurality of locations storing information in each of the dimensions, each of the dimensions corresponding to a different one of a plurality of input color signal components, wherein the number of locations which the data structure contains in a first one of the dimensions is different from the number of locations which the data structure contains in a second one of the dimensions; and
an input to receive first data defined according to a first color space;
logic to generate second data defined according to a second color space, by applying information contained in the data structure to the first data.

18. An apparatus as recited in claim 17, wherein the data structure comprises a plurality of multi-dimensional look-up tables (LUTs), each corresponding to a different output color component.

19. An apparatus as recited in claim 18, wherein each of the multi-dimensional LUTs includes a plurality of locations, each location containing an output color signal value for a particular combination of the plurality of input color signal components.

20. An apparatus as recited in claim 19, wherein the plurality of multi-dimensional LUTs comprises three multi-dimensional look-up tables (LUTs), each corresponding to a different output color signal component, each of the multi-dimensional LUTs having a separate dimension for each of the plurality of input color signal components.

21. An apparatus as recited in claim 20, wherein each of said multi-dimensional LUTs is a three-dimensional LUT.

* * * * *